United States Patent [19]

Farrington et al.

[11] 4,321,160

[45] Mar. 23, 1982

[54] METHOD FOR THE ACTIVATION OF PHOSPHOMOLYBDIC ACID BASED CATALYSTS

[75] Inventors: Diane G. Farrington, Brecksville, Ohio; James F. White, Westchester, Pa.

[73] Assignee: Standard Oil Company, Cleveland, Ohio

[21] Appl. No.: 107,673

[22] Filed: Dec. 27, 1979

[51] Int. Cl.$^3$ .................. B01J 27/14; C07C 51/61
[52] U.S. Cl. ........................... 252/437; 562/547
[58] Field of Search ................................. 252/437

[56] References Cited

U.S. PATENT DOCUMENTS

| | | | |
|---|---|---|---|
| 3,342,849 | 9/1967 | Brill et al. | 252/437 X |
| 3,471,556 | 10/1969 | Yamaguchi et al. | 252/437 X |
| 3,882,047 | 5/1975 | Niina et al. | 252/437 X |
| 3,925,464 | 12/1975 | Oda et al. | 252/437 X |
| 3,936,505 | 2/1976 | Oda et al. | 252/437 X |
| 4,075,122 | 2/1978 | Vineland et al. | 252/437 |
| 4,083,805 | 4/1978 | White et al. | 252/437 |
| 4,138,366 | 2/1979 | Shaw et al. | 252/437 X |

FOREIGN PATENT DOCUMENTS 47-33082 8/1972 Japan .
194772 3/1967 U.S.S.R. ............................. 252/437

*Primary Examiner*—Delbert E. Gantz
*Assistant Examiner*—William G. Wright
*Attorney, Agent, or Firm*—Joseph G. Curatolo; Herbert D. Knudsen; Larry W. Evans

[57] ABSTRACT

The present invention relates to a method for the activation of PMA based catalysts by treating the catalyst precursor with a nitrogen-containing compound such as an oxide of nitrogen gas or a nitrogen acid such as nitric or nitrous at a temperature of from about 125° C. to about 400° C. The method can be employed in a reactor by loading the catalyst precursor, adjusting the reactor temperature to one suitable for activation and optionally sweeping the reactor with an inert gas followed by the treating step. The method herein permits faster, lower temperature catalyst activation than when air activation is employed giving higher oxidative conversion yields and prolonged catalyst life.

11 Claims, No Drawings

METHOD FOR THE ACTIVATION OF PHOSPHOMOLYBDIC ACID BASED CATALYSTS

TECHNICAL FIELD

Catalysts comprising phosphomolybdic acid and various salts thereof have recognized utility in several areas of petrochemical processing. An area of particular importance and which relates to the present invention is the use of phosphomolybdic acid based compounds as catalysts for the selective direct oxidation of unsaturated aldehydes such as methacrolein to its corresponding acid, methacrylic acid. Catalysis with supported or unsupported dehydrated phosphomolybdic acid in combination with small amounts of promoters such as antimony, arsenic, bismuth, copper, tellurium and hydroxides or decomposable salts of alkalis and alkali earth metals is a process of specific economic interest.

More generally, the catalysts which can be activated according to the method set forth herein are redox type catalysts which are utilized in oxidation, ammoxidation and hydrolytic reactions. Such catalysts are often thermally sensitive but can be satisfactorily activated by the method of this invention.

BACKGROUND ART

Catalysts for the oxidation of unsaturated aldehydes to unsaturated acids are generally well known in the literature and in various patents. U.S. Pat. Nos. 2,865,873 and 3,882,047 and Japanese Pat. No. 47-33082 disclose such catalysts wherein ammonia or an ammonium-containing compound is incorporated in the preparation of the catalysts.

U.S. Pat. No. 2,865,873 in Column 13, Examples 101 to 104 discloses a process for the preparation of methacrylic acid using catalysts consisting of molybdenum, phosphorous, titanium and oxygen, wherein ammonium paramolybdate is employed in the preparation of the catalysts. The highest yield of methacrylic acid produced is about 39.56%.

U.S. Pat. No. 3,882,047 discloses the preparation of methacrylic acid using catalysts containing molybdenum, phosphorous, at least one element such as thallium, rubidium, cesium and potassium, and at least one element such as chromium, silicon, aluminum, iron and titanium. This reference teaches the incorporation of ammonia or ammonium-containing compounds in the preparation of all catalysts exemplified in the oxidation of methacrolein or acrolein; phosphomolybdic acid is employed in the preparation of virtually all catalysts exemplified; and in a few examples, ammonium molybdate is employed. This patent discloses in Column 3, lines 7–10 as follows:

"It is preferred that the catalyst be prepared so that the constituent elements will form complex compounds such as heteropolyacids, their acid salts or ammonium salts."

Japanese Pat. No. 47-33082 discloses a process for reclaiming an ammonia-modified phosphorous-molybdenum-X-oxygen catalyst, wherein X is at least one element selected from the group consisting of antimony, arsenic, bismuth, cadmium, germanium, indium, iron, lead, silicon, thallium and tin. Preparation of the catalyst involves treating the catalyst with ammonia and water by oxidizing the catalyst in advance or by oxidizing it simultaneously with the treatment of ammonia and water. This patent discloses that the ammonia forms a complex compound with the other elements present.

Notwithstanding the various methods of preparation disclosed in the foregoing patents, none discloses a fast, low temperature activation of thermally unstable catalysts. We are furthermore unaware of any reference which discloses the activation of these catalysts with oxides of nitrogen.

DISCLOSURE OF THE INVENTION

It is therefore an object of the present invention to provide a method for the activation of PMA based catalysts utilized in the oxidation of unsaturated aldehydes to acids.

It is another object of the present invention to provide a method for the activation of PMA based catalysts in shorter times than have been employed heretofore to yield highly active and selective catalysts.

It is yet another object of the present invention to provide a method for the preparation of thermally unstable catalysts such as PMA based catalysts at temperatures well below normal activation temperatures whereby catalyst life is prolonged.

It is still another object of the present invention to provide a method for the preparation of PMA based catalysts in an atmosphere of nitrogen oxides and/or acids.

These and other objects, together with the advantages thereof over known methods, which shall become apparent from the specification which follows, are accomplished by the invention as hereinafter described and claimed.

In general, the method of the present invention involves the step of treating the catalyst precursor with a nitrogen-containing compound selected from the group of all oxides of nitrogen, nitric acid and nitrous acid at a temperature of from about 125° C. to about 400° C. The treating step is conducted for at least one minute up to about three hours. As will be discussed in greater detail hereinbelow, the oxide of nitrogen preferably employed is nitric oxide.

PREFERRED MODE FOR CARRYING OUT THE INVENTION

The catalyst commonly employed in the preparation of methacrylic acid and acrylic acid from methacrolein and acrolein, respectively, is a PMA based catalyst which can be provided with one or more metallic promoters and which has the general formula $Mo_xP_yA_aB_bC_cD_dE_eO_z$. Suitable promoters include the following: where A is ammonium, cesium, potassium, rubidium and/or thallium; B is copper and/or vanadium and C is antimony, arsenic, bismuth and/or tellurium; D is palladium; E is aluminum, barium, calcium, cerium, chromium, cobalt, iron, magnesium, manganese, nickel, tantalum, titanium, tungsten, zinc, zirconium, chlorine and/or bromine; and, wherein x can be 6 to 14 and is preferably 12, y can be 0.1 to 15 and is preferably 1 to 1.5, a can be 0.1 to 3 and is preferably 1 to 2, b can be 0.1 to 3 and is preferably 0.1 to 1, c can be 0 to 2 and is preferably 0 to 0.7, d can be 0 to 2 and is preferably 0 to 1, e can be 0 to 4 and is preferably 0 to 1, and z is a number necessary to satisfy the other elements. Suitable catalysts and the preparation thereof have been described in several U.S. patents commonly owned by the assignee of record herein and include, for instance, U.S. Pat. Nos. 4,083,805 and 4,138,366. Of these many catalysts, those having a ratio of molybdenum to phosphorous of from about 3:1 to as high as 15:1 can be employed with 9 to 12:1 being preferred. Three catalysts which were activated according to the method of the present invention have the formulae $Mo_{12}PAs_{0.5}Cu_{0.25}O_z$, $Mo_{12}PK_{1.2}Mg_{0.5}As_{0.6}Cu_{0.2}V_{0.5}O_z$ and $Mo_{12}P_{1.33}K_{1.5}Ba_{0.1}V_{0.25}Cu_{0.25}O_z$.

The conversion of aldehyde to acid is accomplished with molecular oxygen, conducted directly to the reaction vessel, or supplied as air. The oxygen and aldehyde reactants are preferably carried by steam with the foregoing reactants collectively being referred to as the reactant feed. The steam can optionally be replaced by recycle gases from the reactor which would normally include nitrogen, oxygen, carbon oxides and other gases which would also comprise a portion of the reactant feed. In some oxidation systems, the reactant feed could also include the effluent from a first stage reactor wherein isobutylene is principally converted to methacrolein. When the effluent comprises the reactant feed, it will be understood that other components will also be present; several that are by products of the first stage conversion and others such as air which would normally be added for the conversion of methacrolein.

The conversion reaction can be conducted in either a fixed-bed or fluid-bed reactor at temperatures of from about 200° C. to about 400° C. and pressures of about 0.2 to about 10 atmospheres. The catalyst may be in a supported or unsupported form; suitable support materials including silica, alumina, boron-phosphate, titania, zirconia and the like and preferably Alundum as well as mixtures thereof. The catalyst can have any of the conventional fixed-bed forms such as coated, tablet, pellet, extruded, spherical, or fluid-bed forms such as microspherical or other forms known in the art. Presence of the catalyst increases the rate and percent of conversion; the selectivity of the reaction, wherein the aldehyde to acid conversion is favored; and the single pass yield.

Activation of the catalyst can be carried out in the reactor by charging the catalyst precursor to the reactor and treating with a nitrogen-containing gas or compound which can be any of the oxides of nitrogen gas or a nitrogen acid such as nitric or nitrous including decomposition components thereof. Nitric oxide has been found to be particularly suitable for this method. If desired, the reactor can be initially flushed with an inert gas, such as helium or nitrogen, although this step is not essential. Similarly, the activating gas can be carried with nitrogen or other inert gas to the reactor for treatment of the catalyst.

The feed of nitric oxide is generally conducted over the catalyst precursor for a period of time of from about one minute to about several hours when a low amount of feed is employed. The amount of the nitric oxide introduced into the reactor can vary as desired but generally an amount volume equal to about 0.5 to about 50 times the volume of the catalyst would be satisfactory. The step of treating can be conducted at a temperature ranging from about 125° C. to about 400° C. with about 150° C. to about 350° C. being preferred. Treatment can be conducted at pressures ranging from near atmospheric to superatmospheric.

In contrast to the known air activation of these catalysts which is conducted at about 370° C., the catalyst composition can be activated according to the method herein, at temperatures between about 125° C. to about 400° C., with a range of about 150° C. to about 350° C. being preferred. Regarding pressure, subatmospheric, ambient or slightly elevated, i.e., between 0.2 and three or four atmospheres, is suitable. Time for the treatment with the nitrogen-containing compound can range from about one minute to about three hours with one hour being preferred.

In actual operation, it is contemplated that a catalyst precursor, comprising the dried salts of the active catalyst component in suitable form for loading in a reactor, would be placed in a reactor and optionally flushed with nitrogen. Heating of the precursor is then conducted followed by the step of treating the catalyst precursor with a nitrogen-containing compound to form the activated catalyst. Following activation treatment, the reactor is heated to reaction conditions as may be necessary and the hydrocarbon reactant, e.g., methacrolein or reactant feed is passed over the catalyst for the desired selective chemical reaction to occur.

Three types of promoted catalysts were activated and subsequently employed for the selective oxidation of methacrolein (MA) to methacrylic acid (MAA). Table I presents the activation conditions and results for the arsenic-copper promoted catalyst precursor $Mo_{12}PAs_{0.5}Cu_{0.25}O_z$ and subsequent oxidations reactions with the catalyst. Examples 1–5 presented therein were given an activation temperature of 245° C. and time of one hour. Nitric oxide with nitrogen, volume percent ratio of 49/51 $NO/N_2$, respectively, was selected as the nitrogen-containing compound for the activation of the catalyst precursor. Using the nitric oxide activated catalyst, a feed of methacrolein/water/air in the volume ratio of 1:8.7:10.6 respectively was fed thereover at 315° C. The volume of the hydrocarbon feed to that of the catalyst per hour was approximately 30. Contact time of the hydrocarbon feed over the catalyst was between two and three seconds.

Example 1 was a control catalyst having only air activation at 245° C. Activity was determined at 320° C. by measuring the conversion to methacrylic acid after one hour of use with the hydrocarbon feed. Another charge of the catalyst precursor was then given an activation treatment with $NO/N_2$ and tested at successive periods of time on-stream with the reactant feed, as presented in Examples 2–5.

In order to evaluate the effectiveness of the method set forth herein, certain yields were calculated by measuring the percent total conversion, percent per single pass yield or percent yield (% Yield) and percent selectivity (% Sel), which are defined as follows:

$$\text{Percent Conversion} = \frac{\text{Moles of methacrolein reacted}}{\text{Moles of methacrolein fed}} \times 100$$

$$\text{Percent Single Pass Yield} = \frac{\text{Moles of product recovered}}{\text{Moles of methacrolein fed}} \times 100$$

$$\text{Percent Selectivity} = \frac{\text{Moles of methacrylic acid recovered}}{\text{Moles of methacrolein reacted}} \times 100$$

TABLE I

Activation of $Mo_{12}PAs_{0.5}Cu_{0.25}O_z$ Precursor with Nitric Oxide

| Example No. | Treatment | Activation Time and Temp °C. | % Yield of MAA | % Sel to MAA | Total Conversion | Run (Hrs.) |
|---|---|---|---|---|---|---|
| 1 | Air | 1 hr. at 245° | 5.12 | 55.8 | 9.2 | 1.0 |
| 2 | $NO/N_2$ | 1 hr. at 245° | 68.4 | 73.4 | 93.2 | 1.0 |
| 3 | — | — | 71.5 | 78.3 | 91.3 | 3.0 |
| 4 | — | — | 76.5 | 86.9 | 88.0 | 19.6 |

TABLE I-continued

Activation of $Mo_{12}PAs_{0.5}Cu_{0.25}O_z$ Precursor with Nitric Oxide

| Example No. | Treatment | Activation Time and Temp °C. | % Yield of MAA | % Sel to MAA | Total Conversion | Run (Hrs.) |
|---|---|---|---|---|---|---|
| 5 | — | — | 74.6 | 85.1 | 87.7 | 24.2 |

As is evident from Table I, activation in air at only 245° C. for one hour was insufficient to bring the catalyst to its full potential. This is reflected by the extremely poor yields for Example 1. In order to activate the catalyst in air, a temperature of approximately 370° C. and a period of time of several hours is necessary. By reviewing the significantly high yields for Examples 2-5, it can readily be seen that the method of the present invention permits the activation of PMA based catalysts to occur at a relatively low temperature and quickly. Inasmuch as the catalyst is activated at a relatively low temperature it will have a greater activity for a longer period of time before regeneration is required.

Table II presents the activation conditions of another catalyst precursor, $Mo_{12}PK_{1.2}Mg_{0.5}As_{0.6}Cu_{0.2}V_{0.5}O_z$, and subsequent oxidation reactions with the catalyst. The catalyst was supported on a 0.3 cm spherical Alundum carrier at the 33 weight percent level. Nitric oxide was again employed with nitrogen gas as in Table I.

Example 6 was a control given an air activation for three hours at 400° C. followed by one hour of hydrocarbon feed at 345° C. For Example 7, another charge of the catalyst precursor received the $NO/N_2$ activation for 0.75 hour at 320° C. followed by one hour of the hydrocarbon feed, after which activity tests were conducted for both examples at 320° C. Significant improvements in total conversion, yield and selectivity were observed following the nitric oxide activation.

TABLE II

Activation of $Mo_{12}PK_{1.2}Mg_{0.5}As_{0.6}Cu_{0.2}V_{0.5}O_z$ Precursor with Nitric Oxide

| Example No. | Treatment | Activation Time and Temp °C. | % Yield of MAA | % Sel to MAA | Total Conversion | Run (Hrs.) |
|---|---|---|---|---|---|---|
| 6 | Air | 3 hrs. at 400° | 21.7 | 85.0 | 25.6 | 1 |
| 7 | $NO/N_2$ | 0.75 hr. at 320° | 75.6 | 86.6 | 87.3 | 1 |

Table III presents the activation conditions of another catalyst precursor $Mo_{12}P_{1.33}K_{1.5}Cu_{0.25}V_{0.25}Ba_{0.1}O_z$, and subsequent oxidations with the catalyst. The catalyst was supported on a 0.3 cm spherical Alundum carrier at the 35 weight percent level. Nitric oxide was employed with nitrogen gas as a carrier for Examples 10, 11, 15 and 16 and with helium for Examples 17 and 18.

Examples 8 and 9 represented a control that had received air activation at 370° C. for one hour and hydrocarbon feed for one hour at 345° C. Two activation tests are reported, one at 320° C., Example 8, and the other at 315° C., Example 9.

For Examples 10 and 11, the catalyst received one hour of air activation at 370° C., one hour of hydrocarbon feed at 345° C. and 0.25 hour of the $NO/N_2$ treatment at 315° C. Activation tests were conducted at 315° C. and 305° C. and have been reported as Examples 10 and 11, respectively.

For Examples 12 and 13, the catalyst received three hours of air activation at 370° C. and one hour of hydrocarbon feed at 345° C. Activation tests were conducted at 320° C. and 305° C. and have been reported as Examples 12 and 13, respectively.

For Example 14, the catalyst received three hours of treatment with nitrogen gas at 370° C. followed by one hour of hydrocarbon feed at 345° C. An activation test was conducted at 320° C. and has been reported as Example 14.

For Examples 15 and 16, the catalyst received 0.75 hour of treatment with $NO/N_2$ at 315° C. Activation tests were conducted at 315° C. and 305° C. and have been reported as Examples 15 and 16, respectively.

For Examples 17 and 18, the catalyst received 0.75 hour of treatment with NO/He at 315° C. following which activation tests were conducted at 315° C. and 305° C. which have been reported as Examples 17 and 18, respectively.

TABLE III

Activation of $Mo_{12}P_{1.33}K_{1.5}Cu_{0.25}V_{0.25}Ba_{0.1}O_z$ Precursor with Nitric Oxide

| Example No. | Treatment | Activation Time and Temp °C. | % Yield of MAA | % Sel to MAA | Total Conversion | Run (Hrs.) |
|---|---|---|---|---|---|---|
| 8 | Air | 1 hr. at 370° | 68.5 | 83.6 | 82.0 | 1 |
| 9 | Air | 1 hr. at 370° | 65.4 | 84.0 | 77.9 | 1 |
| 10 | Air and $NO/N_2$ | 1 hr. at 370°, 0.25 hr. at 315° | 66.3 | 68.5 | 96.8 | 1 |
| 11 | Air and $NO/N_2$ | 1 hr. at 370°, 0.25 hr. at 315° | 72.7 | 77.5 | 93.7 | 1 |
| 12 | Air | 3 hrs. at 370° | 73.1 | 75.7 | 96.5 | 1 |
| 13 | Air | 3 hrs. at 370° | 72.9 | 82.0 | 88.9 | 1 |
| 14 | $N_2$ | 3 hrs. at 370° | 74.1 | 79.6 | 93.0 | 1 |
| 15 | $NO/N_2$ | 0.75 hr. at 315° | 72.9 | 77.3 | 94.4 | — |
| 16 | $NO/N_2$ | 0.75 hr. at 315° | 71.9 | 82.5 | 87.2 | — |
| 17 | NO/He | 0.75 hr. at 315° | 71.8 | 74.7 | 96.1 | — |
| 18 | NO/He | 0.75 hr. at 315° | 75.1 | 84.9 | 88.4 | — |

As is evident from Table II, air activation of the catalyst precursor was highly unsatisfactory, in fact, it was so low that proper activation could not be achieved. Activation with $NO/N_2$, on the other hand, reported in Example 7, was highly satisfactory.

From Table III, it can be seen that the catalyst precursor could be activated in air or nitrogen gas at a temperature of 370° C. for three hours. Treatment with nitric oxide at 315° C. for as little as 0.75 hour provided comparable to slightly better activation.

Based upon the satisfactory yields of methacrylic acid that have been obtained when a PMA based catalyst has been activated according to the method set forth herein, it should be apparent that the objects of the invention have been met. It is to be understood that the activation disclosed herein is applicable in general to PMA based catalysts which, as stated hereinabove, can include one or more promoters. Presence or absence of these additional elements or compounds will not affect the method of preparation set forth herein. And, while these may be employed to improve some aspect of the activity of the catalyst, the specific catalyst composition is not deemed to be a portion of the invention claimed herein.

It should also be apparent to those skilled in the art that the subject invention is operable on PMA based catalysts having certain ratios of molybdenum to phosphorous and it is operable when other oxides of nitrogen or nitrogen-containing acids, temperatures and times are employed. It is to be understood that these variables fall within the scope of the claimed invention and that the subject invention is not to be limited by the examples set forth herein. These have been provided merely to provide a demonstration of operability and therefore the selection of specific nitrogen-containing compounds and reaction conditions can be determined without departing from the spirit of the invention herein disclosed and described. Moreover, the scope of the invention shall include all modifications and variations that fall within the scope of the attached claims.

We claim:

1. A method for the activation of PMA based catalysts comprising the step of:
   treating the dried salts of a catalyst precursor with a nitrogen-containing compound selected from the group consisting of all oxides of nitrogen gas, nitric acid and nitrous acid and mixtures thereof at a temperature of from about 125° C. to about 400° C.

2. A method for the activation of PMA based catalysts, as set forth in claim 1, wherein said step of treating is conducted for a period of from about 1 minute to about three hours.

3. A method for the activation of PMA based catalysts, as set forth in claim 2, wherein the step of treating is conducted at a temperature of from about 150° C. to about 350° C.

4. A method for the activation of PMA based catalysts, as set forth in claim 3, wherein said oxide of nitrogen is nitric oxide and is carried with an inert gas.

5. A method for the activation of PMA based catalysts, as set forth in claim 4, wherein said inert gas is nitrogen.

6. A method for the activation of PMA based catalysts, as set forth in claim 1 or 5, wherein said catalyst precursor comprises phosphorous and molybdenum and at least one promoter-containing compound selected from the group consisting of acids and decomposable salts of promoters selected from the group consisting of ammonium, cesium, potassium, rubidium, thallium, copper, vanadium, antimony, arsenic, bismuth, tellurium, palladium, aluminum, barium, calcium, cerium, chromium, cobalt, iron, magnesium, manganese, nickel, tantalum, titanium, tungsten, zinc, zirconium, chlorine and bromine.

7. A method for the activation of PMA based catalysts, as set forth in claim 6, wherein said PMA based catalyst has the formula $Mo_xP_yA_aB_bC_cD_dE_eO_z$ wherein A is selected from the group consisting of ammonium, cesium, potassium, rubidium and thallium; B is selected from the group consisting of copper and vanadium; C is selected from the group consisting of antimony, arsenic, bismuth and tellurium; D is palladium; E is aluminum, barium, calcium, cerium, chromium, cobalt, iron, magnesium, manganese, nickel, tantalum, titanium, tungsten, zinc, zirconium, chlorine and/or bromine; x can be 6 to 14; y can be 0.1 to 15; a can be 0.1 to 3; b can be 0.1 to 3; c can be 0 to 2; d can be 0 to 2; e can be 0 to 4 and z is a number necessary to satisfy the valence of all the other elements.

8. A method for the activation of PMA based catalysts, as set forth in claim 7, wherein x is 12; y is 1 to 1.5; a is 1 to 2; b is 0.1 to 1; c is 0 to 0.7; d is 0 to 1 and e is 0 to 1.

9. A method for the activation of PMA based catalysts, as set forth in claim 8, wherein the composition of said PMA based catalyst is $Mo_{12}PAs_{0.5}Cu_{0.25}O_z$.

10. A method for the activation of PMA based catalysts, as set forth in claim 8, wherein the composition of said PMA based catalyst is $Mo_{12}PK_{1.2}Mg_{0.5}As_{0.6}Cu_{0.2}V_{0.5}O_z$.

11. A method for the activation of PMA based catalysts, as set forth in claim 8, wherein the composition of said PMA based catalyst is $Mo_{12}P_{1.33}K_{1.5}Cu_{0.25}V_{0.25}Ba_{0.1}O_z$.

* * * * *